United States Patent [19]

Smith

[11] Patent Number: 4,863,325

[45] Date of Patent: Sep. 5, 1989

[54] TWO PIECE BLIND FASTENER WITH LOCK SPINDLE CONSTRUCTION

[75] Inventor: Walter J. Smith, Waco, Tex.

[73] Assignee: Huck Manufacturing Company, Irvine, Calif.

[21] Appl. No.: 425,304

[22] Filed: Sep. 28, 1982

[51] Int. Cl.[4] ............................................. F16B 13/04
[52] U.S. Cl. ........................................ 411/43; 411/70
[58] Field of Search ..................... 411/43, 34, 38, 44, 411/45, 48, 56, 70, 69

[56] References Cited

U.S. PATENT DOCUMENTS

| | | | |
|---|---|---|---|
| Re. 20,055 | 8/1936 | Huck | 411/43 X |
| 2,538,623 | 1/1951 | Keating | 411/43 |
| 3,073,205 | 1/1963 | Siebol | 411/43 |
| 3,285,121 | 11/1966 | Siebol | 411/43 |
| 3,288,016 | 11/1966 | Reynolds | 411/34 |
| 3,377,907 | 4/1968 | Hurd | 411/70 |
| 3,377,908 | 4/1968 | Stau et al. | 411/56 |
| 3,657,957 | 4/1972 | Siebol | 411/70 |
| 3,698,278 | 10/1972 | Trembley | 411/34 |
| 4,046,053 | 9/1977 | Alui et al. | 411/43 |
| 4,355,934 | 10/1982 | Denham et al. | 411/38 |
| 4,405,273 | 9/1983 | Ruhl et al. | 411/43 |

FOREIGN PATENT DOCUMENTS

| | | | |
|---|---|---|---|
| 470120 | 8/1975 | U.S.S.R. | 411/34 |
| 1420025 | 1/1976 | United Kingdom . | |
| 1604727 | 12/1981 | United Kingdom . | |

Primary Examiner—Rodney M. Lindsey
Attorney, Agent, or Firm—Harness, Dickey & Pierce

[57] ABSTRACT

A two piece blind fastener for securing a plurality of workpieces including a hollow sleeve having an enlarged sleeve head at one end, a pin having an enlarged pin head, the pin having a pin stop shoulder and a lock groove located near the pin stop shoulder, the pin head adapted to engage the sleeve to form a blind head in response to a relative axial force applied between the pin and sleeve, the pin stop shoulder adapted to engage the stop shoulder with the material of the sleeve stop shoulder being directed substantially radially inwardly into the lock groove to lock the pin and sleeve together and to finally form a stop surface on the sleeve for stopping axial movement of the pin through the sleeve.

17 Claims, 3 Drawing Sheets

TWO PIECE BLIND FASTENER WITH LOCK SPINDLE CONSTRUCTION

BACKGROUND AND SUMMARY OF THE INVENTION

The present invention relates to blind fasteners and more particularly to two piece blind fasteners including a pin (or spindle) and a sleeve and having a mechanical lock structure for locking the pin and sleeve together.

In many blind fastener applications it is desirable that the pin and sleeve be mechanically locked together to inhibit separation and loss of the pin through vibration, etc. Examples of such blind fasteners can be seen in the following U.S. Pat. No. 4,046,053 for Blind Rivet issued on September 6, 1977 to Alvi et al, No. 3,288,016 for Blind Two-Piece Fastener issued on November 29, 1966 to Reynolds, and No. 2,538,623 for Rivet Assembly issued on January 16, 1951 to Keating.

In the present invention a two piece blind fastener (including a pin and a sleeve) of simple construction is provided in which an internal portion of the sleeve is folded and/or moved radially inwardly by a portion of the pin into a lock pocket on the pin.

Thus it is an object of the present invention to provide a novel two piece blind fastener, including a pin and a sleeve, and in which the pin and sleeve are mechanically locked together by material from the sleeve which is folded and/or moved radially inwardly into a lock pocket in the pin.

It is another object of the present invention to provide a novel mechanical lock for the pin and sleeve of a two piece blind fastener.

It is a general object of the present invention to provide a new and improved two piece blind fastener.

Other objects, features, and advantages of the present invention will become apparent from the subsequent description and the appended claims, taken in conjunction with the accompanying drawings, in which:

Figures 1, 2:
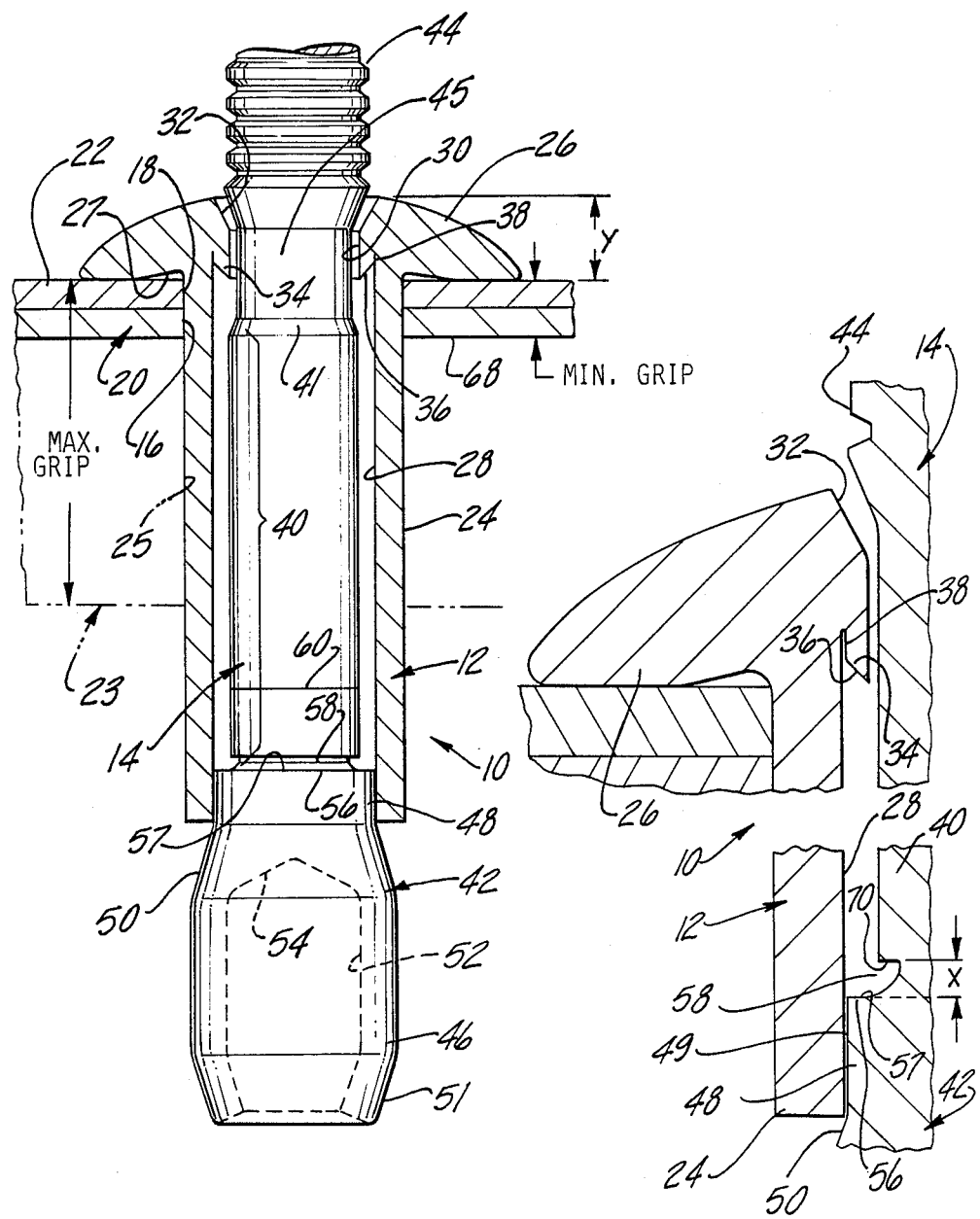
FIG. 1 is an elevational view, with some parts shown in section and others shown broken away, of a blind fastener, including a pin and a sleeve and embodying features of the present invention and shown, prior to installation, in relationship to a pair of workpieces to be fastened together.
FIG. 2 is a fragmentary view, to enlarged scale, with some parts shown in section and others shown broken away of a portion of the lock and stop mechanism on the sleeve and pin of FIG. 1.

Looking now to FIG. 1, a blind fastener 10, including a hollow sleeve 12 and a pin 14, is shown located in aligned openings 16 and 18, in workpieces 20 and 22, respectively, which are to be joined together. Workpieces 20 and 22 have a combined thickness representing the minimum grip for the fastener 10. The addition of workpiece 23 (with opening 25), shown in phantom, represents the maximum grip for the fastener 10. The thickness of workpiece 23 represents the grip range for fastener 10, i.e. the general maximum range of workpiece thickness in which fastener 10 operates between minimum and maximum grip.

The hollow sleeve 12 has a generally straight shank portion 24 of a uniform outside diameter which terminates at its forward end in an enlarged head 26. The enlarged head 26 has a concave recess 27 adjacent the shank portion 24 to provide clearance with the outer edge of opening 18.

Sleeve 12 has a central through bore which includes a shank bore portion 28 which extends generally for the length of the shank portion 24 and communicates proximate the enlarged head 26 with a reduced diameter bore portion 30 which in turn terminates in a countersunk portion 32. An annular stop shoulder 34 is defined at the juncture of shank bore portion 28 and the reduced diameter bore portion 30.

An enlarged view of the stop shoulder portion of the sleeve 12 and pin 14 is shown in FIG. 2. Thus it can be seen that the stop shoulder 34 terminates in a radially inwardly rearwardly inclined generally frusto-conical surface 36. It can also be seen that the stop shoulder 34 is further separated from the radially confronting portion of the sleeve 12 by an annular slit 38 which extends axially forwardly towards the enlarged head 26.

The pin 14 has an elongated generally smooth pin shank portion 40 which terminates in an enlarged head 42 at its rearward end (the blind end of fastener 10); pin 14 has a plurality of annular pull grooves 44 at the opposite end connected to the shank portion 40 by a smooth, reduced diameter portion 45; a tapered portion 41 connects shank portions 40 and 45. The diameter of pin shank portion 40 is generally the same as that of the reduced diameter bore portion 30 in sleeve 12, i.e. slight clearance to slight interference while the smooth portion 45 is in substantial clearance with bore portion 30. The maximum or crest diameter of the pull grooves 44, however, is larger than bore portion 30 and thereby holds the sleeve 12 and pin 14 together in a pre-assembled condition prior to installation. The pull grooves 44 are rolled from the same diameter as portion 45 after the pin 14 has been inserted into sleeve 12; the ample clearance between that initially reduced diameter of the pre-rolled pull groove pin portion and the reduced diameter bore portion 30 facilitates assembly while minimizing engagement and/or scraping of the pre-rolled portion (the extension of portion 45) with the sleeve stop shoulder 34.

The pin head 42 has an enlarged diameter end portion 46 connected to a reduced diameter portion 48 by a frusto-conical or tapered portion 50. The reduced diameter head portion 48 is of a diameter to fit snugly or with a slight clearance within the shank bore portion 28 of sleeve 12. The pin head 42 is generally hollow by way of a blind bore 52 which terminates in a tapered portion 54 which extends generally into the region of the frusto-conical head portion 50. The end of pin head 46 is partially closed via a frusto-conical portion 51. The outside diameter of the head end portion 46 is generally around that of the outside diameter of the sleeve shank portion 24.

An annular pin stop shoulder 56 is defined by the juncture of the reduced diameter head portion 48 and the pin shank portion 40 and has an end surface 57 which is generally planar and in a plane in quadrature with the longitudinal axis of the pin 14 (see FIG. 2). A lock pocket 58 is defined by an annular groove located immediately adjacent the pin stop 56. Axially forwardly a preselected distance from the lock pocket 58 is an annular breakneck groove 60. The breakneck groove 60 can be generally closed and of a type shown in the U.S. Patent to Fry No. 3,292,482 and defines the weakest section of the pin 14.

The fastener 10 is adapted to be set by an installation tool which can be of a type well known in the art and hence the details thereof have been omitted for simplicity. However, it should be noted that the tool has a chuck jaw assembly which is adapted to grippingly engage the pull grooves 44 of the pin 14 while an anvil engages the enlarged sleeve head 26. Upon actuation of the tool, the jaw assembly moves axially away from the anvil whereby a relative axial force is applied between the pin 14 and sleeve 12.

Figure 3:
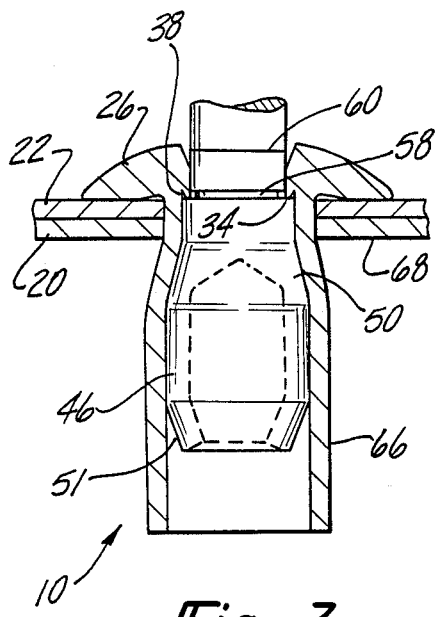
FIG. 3 is an elevational view of the fastener of FIG. 1 depicting the fastener partially installed.
Figure 4:
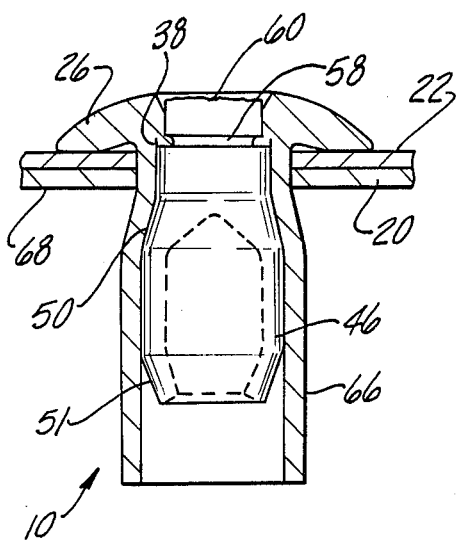
FIG. 4 is an elevational view of the fastener of FIG. 1 depicting the fastener in its final set form.
Figure 5:
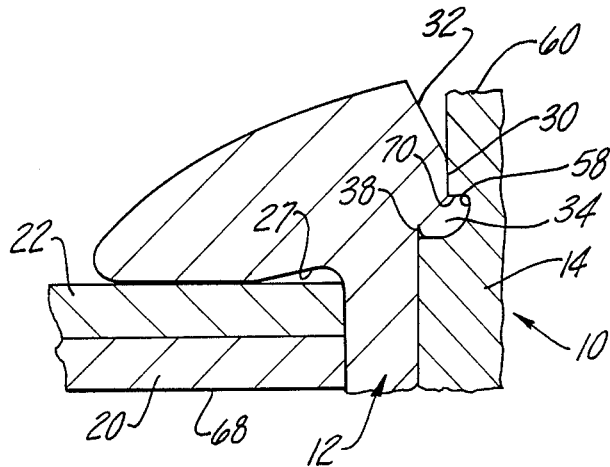
FIG. 5 is a fragmentary view, to enlarged scale, with some parts shown in section of the lock mechanism fully set between the sleeve and pin.
Figure 6:
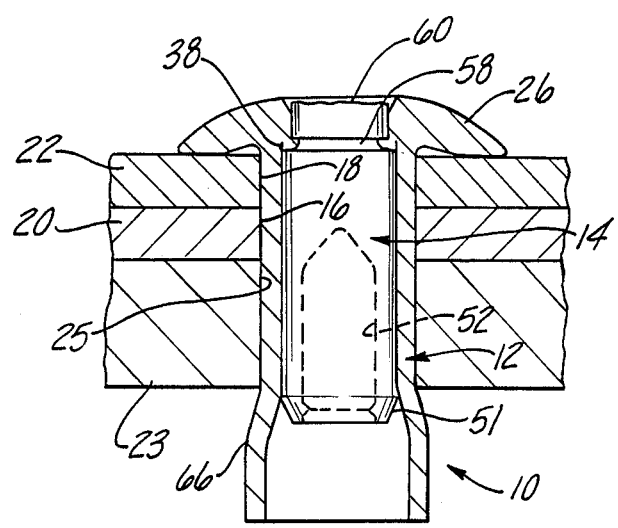
FIG. 6 is an elevational view of the fastener of FIG. 1 depicting the fastener in its final set form for workpieces of a maximum grip.

As this relative axial force increases in magnitude, the pin 14 is pulled into the sleeve 12 and the tapered head portion 50 is moved into the end of the sleeve 12 to expand that end to form an enlarged, tulip shaped blind head 66; this initial action can be seen in FIG. 3. With continued tool actuation, the pin 14 is moved farther into the sleeve 12. With the thickness of workpieces 20 and 22 as shown in the drawings only a slight portion of the enlarged pin head 42 will be moved into the sleeve 12 past the rearward or blind side surface 68 of workpiece 20. The blind head 66, of course, has already been formed (see FIG. 3) outside of the surface 68 and further radial sleeve expansion will be limited by the workpiece opening 16. For workpieces of greater combined thickness (see FIGS. 1 and 6 including the workpiece 23) in order to permit axial movement of the pin head 42 into workpiece opening 25 without the need for excessive loads on the pin 14, the blind bore 52 is sized to permit the pin head 42 to collapse (see FIG. 6) at a preselected low load as it is moved into the region of the sleeve 12 captured by the workpiece openings 16, 18 and/or 25.

The pin shank portion or land 40 is moved into the reduced diameter sleeve bore 30 and acts as a guide for the pin 14 to assist alignment of pin stop shoulder 56 with sleeve stop shoulder 34. The taper 41 assists in piloting of the pin land 40 as it enters sleeve bore 30.

As axial movement of the pin 14 continues the pin stop shoulder surface 57 engages the sleeve stop shoulder surface 36 moving it radially inwardly into the lock pocket 58. After the lock pocket 58 has been substantially filled, movement of the pin 14 is arrested and the relative axial force applied between the pin 14 and sleeve 12 increases until a force of preselected magnitude is reached at which the pin 14 is fractured at the breakneck groove 60. Note that the breakneck groove 60 and pin stop shoulder 56 are separated by a preselected distance such that when the pin stop shoulder 56 is held from farther axial movement by the sleeve stop shoulder 34, the breakneck groove 60 will be located within the sleeve bore portions 30 and 32 such that upon fracture the outer, fractured end of the pin 14 will generally not extend beyond the adjacent outer surface of the sleeve head 26.

Note that the sleeve stop shoulder surface 36 is inclined to assist the material thereof to be folded or moved radially inwardly. In this regard the engaging surface of pin stop shoulder 56 is oriented relative to that of the sleeve surface 36 such as to assist in the radially inwardly folding action; thus the material of sleeve stop shoulder 34 will be substantially directed radially inwardly and not radially outwardly. As previously discussed, the sleeve stop shoulder 34 is annularly separated for a selected distance along the annular slit 38. This slit or separation enhances the radially inward folding action of the material of the sleeve stop shoulder 34 into the lock groove 58. Of course, the tapered sleeve surface 36 defines the initial radial separation of the sleeve stop shoulder 34 from the radially confronting portion of the sleeve 12.

The volume of the material of the sleeve stop shoulder 34 is selected relative to the volume of the lock groove 58 such that the lock groove 58 will be substantially filled and axial movement of the pin 14 will be stopped at the desired location generally when that filled condition occurs, i.e. such that pin break at breakneck 60 occurs within the sleeve head. Thus the volume of sleeve stop shoulder 34 which is separated from the remainder of the sleeve 12 by the tapered portion and slit 38 is generally equal to or greater than the volume necessary to fill the lock groove 58 and adjacent area between the pin 14 and sleeve 12.

At the same time, the axial length of slit 38 is limited to inhibit axial shearing of the sleeve stop shoulder 34 and/or the impairment of the pin stopping function. In one form of the invention, the slit 38 and taper of sleeve stop shoulder 34 was selected to define approximately 140% of the volume desired to adequately fill the lock groove 58 and the adjacent volume between the pin 14 and sleeve 12 at that location (based on pre-installation volumes). Note that the excess volume of sleeve shoulder lock material accommodates increases in volume of the lock groove 58 caused by pin stretch.

It can be seen then that, with the construction of the present invention, the sleeve stop shoulder 34 is axially movable and, in a sense, is formed as a stop for stopping movement of the pin 14 after it has been folded or moved radially inwardly to generally completely fill the available volume in the area of the lock groove 58 to form the mechanical lock.

At the same time the pin stop shoulder surface 57 first acts to fold and/or deform the material of the sleeve stop shoulder 34 radially inwardly; as this occurs substantially all of the surface 57 (including that portion extending into lock groove 58) will be active as a stop. Note that in filling the lock groove 58 the movement of lock material from sleeve stop shoulder 34 is generally entirely radially inwardly.

The sleeve stop shoulder 34 as separated from the remainder of the sleeve 12 by the taper and slit 38 is generally located within the confines of the enlarged sleeve head 26. The sleeve head 26 provides radial stiffness and resists any tendency for radial expansion of sleeve 12 as the shoulder 38 is deformed into the lock groove 58. In this regard the breakneck groove 60 is designed to fracture at an axial load greater than that load at which the filling of the lock groove 58 occurs; thus after filling, the additional axial force necessary for pin break could urge the sleeve material to radially expand the sleeve 14. This radial displacement of sleeve material could result in axial movement of the pin 14 making its final position more difficult to control. By locating the sleeve stop shoulder 34 substantially within the confines of the sleeve head 26, such radial expansion is inhibited. Thus radial confinement of the sleeve 12 by the workpiece bores 16 and 18 is not essential. In fact, the fastener 10 could be satisfactorily installed with an adequate lock where there is a substantial radial clearance between bores 16 and 18 and sleeve 12.

The above construction promotes good filling of the lock groove 58 and also minimizes variations in the axial position of the pin 14 at which the groove 58 is filled and the shoulder stop is formed and hence permits consistency of location of the fracture of the breakneck groove 60 within the confines of sleeve head 26.

In one form of the invention the pin 14 and sleeve were made of a ferrous material with the pin 14 having a hardness of around Rockwell C 40 and the sleeve 12 having a hardness of around Rockwell B 90.

Typically the pin 14 and sleeve 12 are plated with a zinc, cadmium or other suitable material to provide corrosion resistance. The plating also serves as a lubricant and reduces friction between the pin 14 and sleeve 12 during installation thereby assisting consistent performance. Frictional affects can be further reduced by the use of a light coat of a lubricant such as SPERMAFOL 5200, which is a trademarked product of Ashland Oil, Inc.

The pin 14 and sleeve 12 are assembled after plating (and lubricating if used); hence the pull grooves 44 are rolled after plating thereby providing their formation to be dimensionally closer to the desired pull groove form. Because the pull grooves 44 hold the pin 14 and sleeve 12 together for handling prior to installation there is no need for tight interference engagement between any portion of the pin 14 and sleeve 12 to assist in the maintenance of the pre-installation assembly of the pin 14 and sleeve 12. Thus the pin shank portion 45 can be in a substantial clearance relationship with reduced diameter sleeve bore 30. The guide land 40 is sized to be within a range to define a slight clearance or slight interference only with sleeve bore 30. Also the reduced diameter pin head portion 48 will similarly be of a slight clearance or interference fit with sleeve bore 28. In fact in one form of the invention (see FIG. 2) the radially outer surface 49 of pin head portion 48 is tapered slightly radially outwardly in an axial rearward direction (i.e. towards the blind side of fastener 10) such that the radially outer edge of pin stop shoulder surface 57 is in slight clearance with sleeve bore 28. All of the above reduces frictional loads and minimizes scraping the plating and/or other material from the pin 14 and sleeve 12 which could fill the lock groove 58 and inhibit its ability to adequately receive the lock material of the sleeve stop shoulder 34.

It is believed desirable to have the lock groove 58 located very close and/or contiguous to the pin stop shoulder 57 in order to promote the effectiveness of its fill by the material of the sleeve stop shoulder 34. It is also believed desirable that the forwardmost wall 70 of the lock groove 58 be axially spaced as far as possible from the breakneck groove 60 with both, of course, located substantially within the confines of the sleeve head 26 for reasons previously described.

It has been found, in one form of the invention, desirable to limit the axial length X of the lock groove 58. Thus for a sleeve 12 having a nominal outside diameter of shank portion 24 of 0.250" and having a head height Y in the range of around 0.107" to 0.117", an axial length X of lock groove 58 in the range of around 0.005" to 0.025" is believed satisfactory. A substantially shorter or greater length lock groove 58 could lessen the retention force of pin 14. In one form of the invention the axial length X was in the range of around 0.010" to 0.016".

It should also be noted that the lock mechanism of fastener 10 is performed by the interaction of pin 14 and sleeve 12 and is not dependent upon any special construction of the installation tool.

In another form of the invention, the pin stop shoulder is radially inclined to additionally assist in directing the material of the sleeve stop shoulder radially inwardly. This can be seen in the embodiment shown in FIG. 7 in which components similar to like components in the embodiment of FIGS. 1-4 are given the same numeral designation with the addition of the letter postscript "a".

Figure 7:
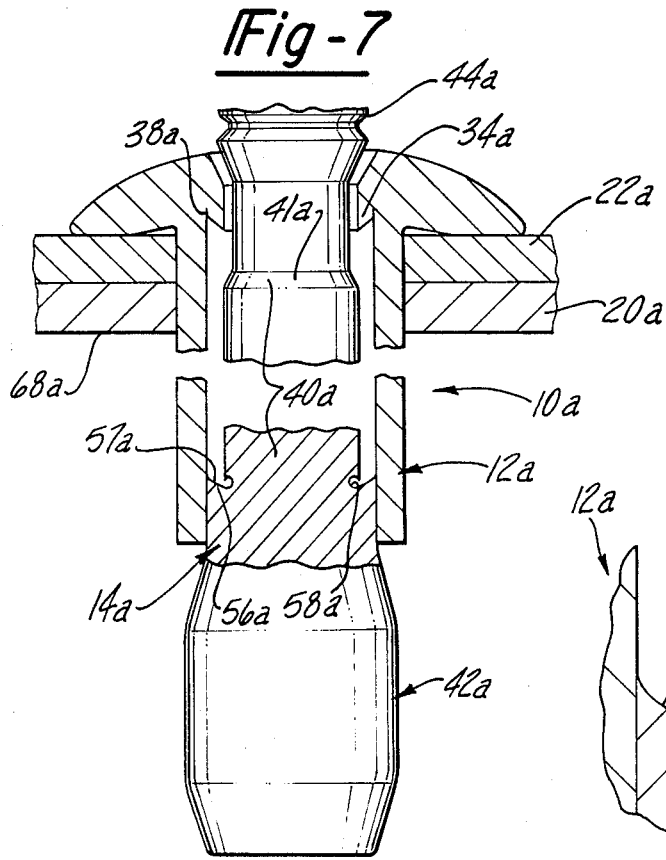
FIG. 7 is a fragmentary elevational view of a fastener similar to that of FIG. 1 depicting a modified form of pin for the blind fastener.
Figure 8:
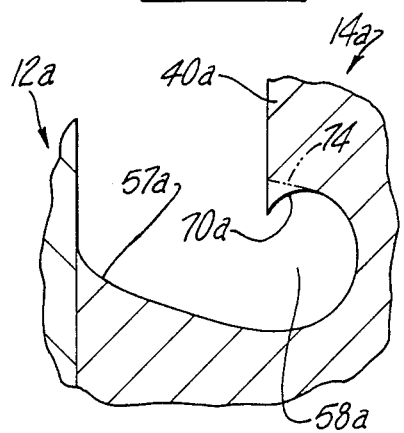
FIG. 8 is a fragmentary view to enlarged scale of the lock groove of the pin of FIG. 7.

In FIG. 7, the blind fastener 10a has a hollow sleeve 12a and a pin 14a. The pin 14a includes an annular pin stop shoulder 56a having an end surface 57a which is generally frusto-conically shaped, extending radially outwardly and axially forwardly, i.e. in a direction away from the pin head 42a. Thus, when the inclined end surface 57a of pin stop 56a engages the sleeve stop shoulder 34a, the material of sleeve stop shoulder 34a will be directed radially inwardly into the annular lock groove 58a. It should be noted that the annular lock groove 58a is formed to have its forward wall 70a curved or hooked rearwardly. This assists the groove 58a in retaining the lock material of sleeve stop shoulder 34a and resisting rearward push out of pin 14a. In this regard it should be noted that it is desirable that the forward wall not be inclined forwardly and radially outwardly (as shown by the phantom line 74) and that it be formed at least generally to be in a plane in quadrature with the axis of fastener 10a. The latter structure is shown in the embodiment of FIGS. 1-4 (see wall 70).

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A two piece blind fastener for securing a plurality of workpieces comprising:
   a hollow sleeve having a through bore,
   said sleeve having a sleeve shank portion and an enlarged sleeve head at one end,
   a pin,
   said pin having a shank portion and an enlarged pin head, said pin shank portion adapted to be located within said bore of said sleeve with said pin head located at the end of said sleeve shank portion opposite said sleeve head,
   said through bore of said sleeve having an enlarged bore portion and a reduced diameter bore portion proximate thereto and defining a radially inwardly extending sleeve stop shoulder at the juncture of said enlarged and reduced bore portions,
   said pin having a pin shoulder portion adjacent said pin shank portion and being of a diameter larger than that of said pin shank portion,
   a pin stop shoulder defined by the juncture of said pin shoulder portion and said pin shank portion,
   a lock groove located proximate said pin stop shoulder,
   said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said sleeve stop shoulder having at least a portion thereof radially separated from a radially confronting portion of said enlarged bore portion whereby radial inward movement of the material of said sleeve stop shoulder by said pin stop shoulder is facilitated and radial expansion of said sleeve stop shoulder is inhibited.

2. The fastener of claim 1 with the radially separated portion of said sleeve stop shoulder defining a volume sufficient to generally fill the volume defined by said lock groove.

3. The fastener of claim 1 with said sleeve stop shoulder being radially separated from a radially confronting portion of said enlarged bore portion by an annular slit.

4. The fastener of claim 3 with the radially separated portion of said sleeve stop shoulder defining a volume sufficient to generally fill the volume defined by said lock groove.

5. A two piece blind fastener for securing a plurality of workpieces comprising:

a hollow sleeve having a forward end and a rearward end and a through bore, said sleeve having a sleeve shank portion and an enlarged sleeve head at said forward end, a pin, said pin having a shank portion and an enlarged pin head, said pin shank portion adapted to be located within said bore of said sleeve with said pin head located at said rearward end of said sleeve shank portion, said through bore of said sleeve having an enlarged bore portion and a reduced diameter bore portion proximate thereto and defining a radially inwardly extending sleeve stop shoulder at the juncture of said enlarged and reduced bore portions, said pin having a pin shoulder portion adjacent said pin shank portion and being of a diameter larger than that of said pin shank portion, a pin stop shoulder defined by the juncture of said pin shoulder portion and said pin shank portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said sleeve stop shoulder terminating in a generally tapered portion defined by a surface extending axially rearwardly and radially inwardly from a radially confronting portion of said enlarged bore portion.

6. A two piece blind fastener for securing a plurality of workpieces comprising:

a hollow sleeve having a through bore, said sleeve having a sleeve shank portion and an enlarged sleeve head at one end, a pin, said pin having a shank portion and an enlarged pin head, said pin shank portion adapted to be located within said bore of said sleeve with said pin head located at the end of said sleeve shank portion opposite said sleeve head, said through bore of said sleeve having an enlarged bore portion and a reduced diameter bore portion proximate thereto and defining a radially inwardly extending sleeve stop shoulder at the juncture of said enlarged and reduced bore portions, said pin having a pin shoulder portion adjacent said pin shank portion and being of a diameter larger than that of said pin shank portion, a pin stop shoulder defined by the juncture of said pin shoulder portion and said pin shank portion, a generally annular lock groove located proximate to said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, a pin shoulder surface on said pin stop shoulder extending radially outwardly to define an included angle with the pin axis which is generally no greater than around 90°, said pin having a pull portion adapted to be gripped by a tool for applying said axial force, a breakneck groove connecting said pull portion to said pin shank portion and being adapted to fracture at a preselected magnitude of said axial force, said breakneck groove connected with said annular lock groove by a generally uniform section of said pin shank portion, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of said axial force is inhibited, said maximum axial distance being generally equal to said preselected axial length of said sleeve head, for finally locating said lock groove and said breakneck groove generally within the confines of said sleeve head.

7. A two piece blind fastener for securing a plurality of workpieces comprising:

a hollow sleeve having a through bore, said sleeve having a sleeve shank portion and an enlarged sleeve head at one end, a pin, said pin having a shank portion and an enlarged pin head, said pin shank portion adapted to be located within said bore of said sleeve with said pin head located at the end of said sleeve shank portion opposite said sleeve head, said through bore of said sleeve having an enlarged bore portion and a reduced diameter bore portion proximate thereto and defining a radially inwardly extending sleeve stop shoulder at the juncture of said enlarged and reduced bore portions, said sleeve stop shoulder being radially separated from a radially confronting portion of said enlarged bore portion, said pin having a pin shoulder portion adjacent said pin shank portion and being of a diameter larger than that of said pin shank portion, a pin stop shoulder defined by the juncture of said pin shoulder portion and said pin shank portion, a lock groove located proximate to said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said pin having a pull portion adapted to be gripped by a tool for applying said axial force, a breakneck groove connecting said pull portion to said pin shank portion and being adapted to fracture at a preselected magnitude of said axial force, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of said axial force is inhibited, said maximum axial distance being generally equal to said preselected axial length of said sleeve head, for finally locating said lock groove and said breakneck groove generally within the confines of said sleeve head.

8. The fastener of claim 7 with the radially separated portion of said sleeve stop shoulder defining a volume sufficient to generally fill the volume defined by said lock groove.

9. A two piece blind fastener for securing a plurality of workpieces comprising:

a hollow sleeve having a through bore, said sleeve having a sleeve shank portion and an enlarged sleeve head at one end, a pin, said pin having a shank portion and an enlarged pin head, said pin shank portion adapted to be located within said bore of said sleeve with said pin head located at the end of said sleeve shank portion opposite said sleeve head, said through bore of said sleeve having an enlarged bore portion and a reduced diameter bore portion proximate thereto and defining a radially inwardly extending sleeve stop shoulder at the juncture of said enlarged and reduced bore portions, said pin having a pin shoulder portion adjacent said pin shank portion and being of a diameter larger than that of said pin shank portion, a pin stop shoulder defined by the juncture of said pin shoulder portion and said pin shank portion, a lock groove located proximate to said pin stop shoulder, said pin head adapted to engage said sleeve shank portion and to deform the same to form a blind head opposite said sleeve head in response to a relative axial force applied between said pin an said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said pin having a pull portion adapted to be gripped by a tool for applying said axial force, a breakneck groove connecting said pull portion to said pin shank portion and being adapted to fracture at a preselected magnitude of said axial force, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of said axial force is inhibited, said maximum axial distance being generally equal to said preselected axial length of said sleeve head, for finally locating said lock groove and said breakneck groove generally within the confines of said sleeve head, said sleeve stop shoulder being radially separated from a radially confronting portion of said enlarged bore portion and with the radially separated portion of said sleeve stop shoulder defining a volume greater than that required to fill the volume defined by said lock groove in its pre-installed condition whereby expansion of the volume of said lock groove during installation can be accommodated.

10. A two piece blind fastener for securing a plurality of workpieces comprising:

a hollow sleeve having a forward end and a rearward end and a through bore, said sleeve having a sleeve shank portion and an enlarged sleeve head at said forward end, a pin, said pin having a shank portion and an enlarged pin head, said pin shank portion adapted to be located within said bore of said sleeve with said pin head located at said rearward end of said sleeve shank portion, said through bore of said sleeve having a reduced diameter bore portion defining a radially inwardly extending sleeve stop shoulder, said pin having a pin shoulder portion adjacent said pin shank portion and being of a diameter larger than that of said pin shank portion, a pin stop shoulder defined by the juncture of said pin shoulder portion and said pin shank portion, a generally annular lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to inhibit radial expansion of said sleeve stop shoulder and to finally form a stop surface on said sleeve for stopping axial movement of said pin through said sleeve, said engaging surface means including, a pin shoulder surface on said pin stop shoulder extending radially outwardly to define an included angle with the pin axis which is generally no greater than around 90°, said pin shoulder surface being generally radially in line with the rearward extremity of said lock groove.

11. A two piece blind fastener for securing a plurality of workpieces comprising:

a hollow sleeve having a forward end and a rearward end and a through bore, said sleeve having a sleeve shank portion and an enlarged sleeve head at said forward end, a pin having a central axis, said pin having a shank portion and an enlarged pin head, said pin shank portion adapted to be located within said bore of said sleeve with said pin head located at said rearward end of said sleeve shank portion, said through bore of said sleeve having a reduced diameter bore portion defining a radially inwardly extending sleeve stop shoulder, said pin having a pin shoulder portion adjacent said pin shank portion and being of a diameter larger than that of said pin shank portion, a pin stop shoulder defined by the juncture of said pin shoulder portion and said pin shank portion, a lock groove located proximate said pin stop shoulder, said pin head adapted to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said engaging surface means including a pin shoulder surface on said pin stop shoulder extending radially outwardly to define an included angle with said pin axis which is generally no greater than around 90°, said lock groove being defined in part at its rearward end by said pin stop surface, said sleeve stop shoulder terminating in a taper and with said engaging surface means further including an axially rearwardly and radially inwardly inclined sleeve shoulder surface defining said taper.

12. A two piece blind fastener for securing a plurality of workpieces comprising:

a hollow sleeve having a forward end and a rearward end and a through bore, said sleeve having a sleeve shank portion and an enlarged sleeve head at said forward end, a pin having a central axis, said pin having a shank portion and an enlarged pin head, said pin shank portion adapted to be located within said bore of said sleeve with said pin head located at said rearward end of said sleeve shank portion, said through bore of said sleeve having a reduced diameter bore portion defining a radially inwardly extending sleeve stop shoulder, said pin having a pin shoulder portion adjacent said pin shank portion and being of a diameter larger than that of said pin shank portion, a pin stop shoulder defined by the juncture of said pin shoulder portion and said pin shank portion, a lock groove located proximate said pin stop shoulder, said pin head adatped to engage said sleeve shank portion and to deform the same to form a blind head opposite said sleeve head in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said engaging surface means including a pin shoulder surface on said pin stop shoulder extending radially outwardly to define an included angle with the pin axis which is generally no greater than around 90°, said lock groove being defined in part at its rearward end by said pin shoulder surface and at its forward end by an axially rearwardly, radially outwardly extending surface.

13. A two piece blind fastener for securing a plurality of workpieces comprising:

a hollow sleeve having a forward end and a rearward end and a through bore, said sleeve having a sleeve shank portion and an enlarged sleeve head at said forward end, a pin, said pin having a shank portion and an enlarged pin head, said pin shank portion adapted to be located within said bore of said sleeve with said pin head located at said rearward end of said sleeve shank portion, said through bore of said sleeve having a reduced diameter bore portion defining a radially inwardly extending sleeve stop shoulder, said pin having a pin shoulder portion adjacent said pin shank portion and being of a diameter larger than that of said pin shank portion, a pin stop shoulder defined by the juncture of said pin shoulder portion and said pin shank portion, a generally annular lock groove located proximate said pin stop shoulder, said pin head adapted to engage said sleeve shank portion and to deform the same to form a blind head at said rearward end of said sleeve in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said engaging surface means including a pin shoulder surface on said pin stop shoulder extending radially outwardly to define an included angle with the pin axis which is generally no greater than around 90°, said pin shoulder surface being generally radially in line with the rearward extremity of said lock groove, said lock groove having its forward extremity defined by a radial surface extending at an angle no greater than around 90° with said pin axis.

14. A two piece blind fastener for securing a plurality of workpieces comprising:

a hollow sleeve having a forward end and a rearward end and a through bore, said sleeve having a sleeve shank portion and an enlarged sleeve head at said forward end, a pin, said pin having a shank portion and an enlarged pin head, said pin shank portion adapted to be located within said bore of said sleeve with said pin head located at said rearward end of said sleeve shank portion, said through bore of said sleeve having a reduced diameter bore portion defining a radially inwardly extending sleeve stop shoulder, said pin having a pin shoulder portion adjacent said pin shank portion and being of a diameter larger than that of said pin shank portion, a pin stop shoulder defined by the juncture of said pin shoulder portion and said pin shank portion, a generally annular lock groove located proximate said pin stop shoulder, said pin head adapted to engage said sleeve shank portion and to deform the same to form a blind head at said rearward end of said sleeve in response to a relative axial force applied between said pin and said sleeve, said pin stop shoulder adapted to engage said sleeve stop shoulder, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said engaging surface means including a pin shoulder surface on said pin stop shoulder extending radially outwardly to define an included angle with the pin axis which is generally no greater than around 90°, said pin shoulder surface being generally radially in line with the rearward extremity of said lock groove, said lock groove having its forward extremity defined by a radial surface extending at an angle no greater than around 90° with said pin axis, said pin having a pull portion adapted to be gripped by a tool for applying said axial force, a breakneck groove connecting said pull portion to said pin shank portion and being adapted to fracture at a preselected magnitude of said axial force, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of axial force is inhibited, said maximum axial distance being generally equal to said preselected axial length of said sleeve head for finally locating said lock groove and said breakneck groove generally within the confines of said sleeve head.

15. The two piece blind fastener of claim 14 with said lock groove having an axial length in the range of around 0.005 inches to around 0.025 inches where said sleeve shank portion has an outside diameter of around 0.250 inches.

16. The two piece blind fastener of claim 14 with said lock groove having an axial length in the range of around 0.005 inches to around 0.025 inches where said preselected axial length of said sleeve head is in the range of around 0.107 inches to around 0.117 inches.

17. The two piece blind fastener of claim 14 with said lock groove having an axial length in the range of around 0.005 inches to around 0.025 inches where said preselected axial length of said sleeve head is in the range of around 0.107 inches to around 0.117 inches and where said sleeve shank portion has an outside diameter of around 0.250 inches.

* * * * *